S. STEVENS.
AUTOMATIC SWITCH FOR CIRCUITS OF INTERNAL COMBUSTION ENGINES.
APPLICATION FILED OCT. 6, 1920.
1,422,318.  Patented July 11, 1922.
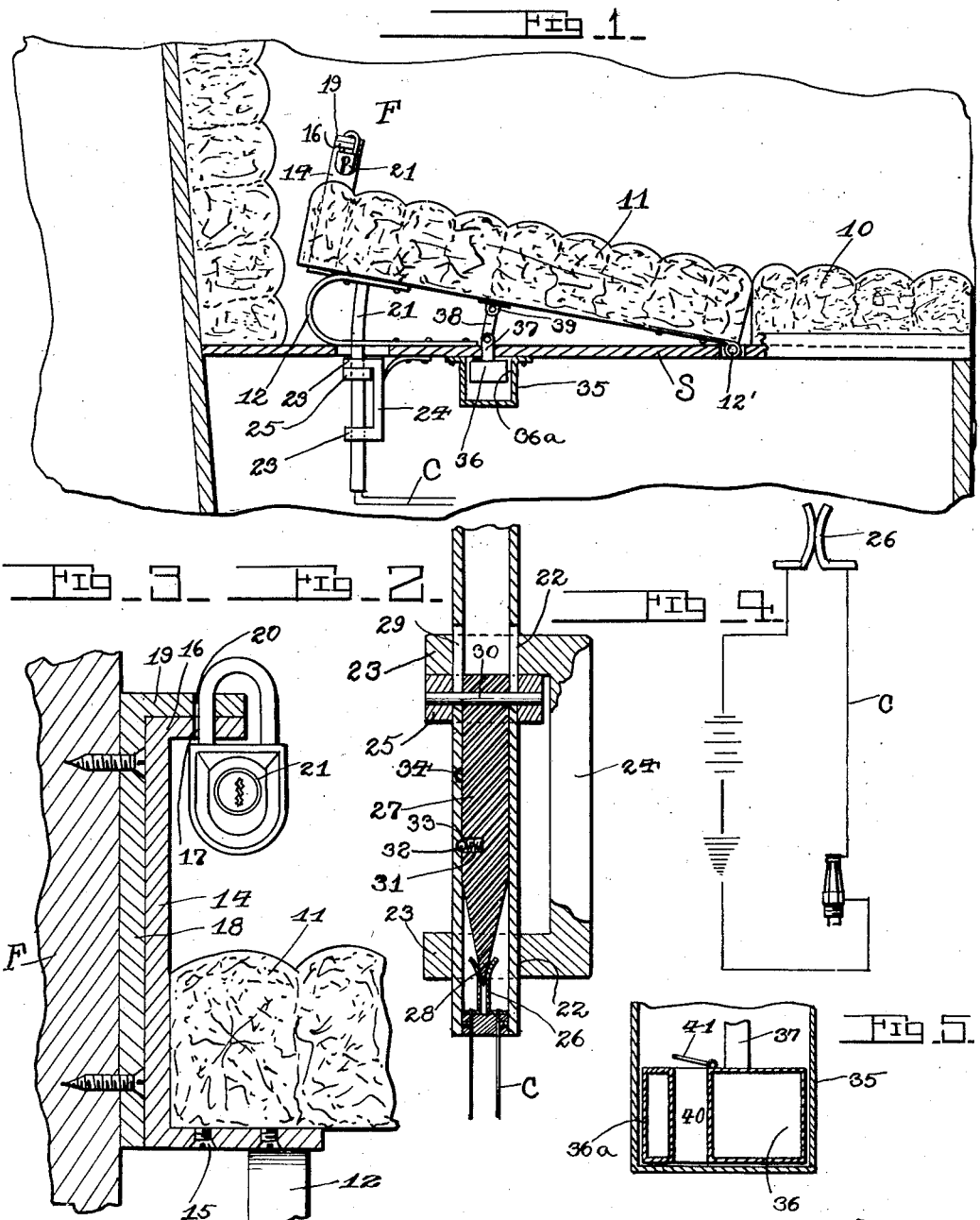
Inventor
Sidney Stevens.
By Watson E. Coleman
Attorney

UNITED STATES PATENT OFFICE.

SIDNEY STEVENS, OF MILLINOCKET, MAINE.

AUTOMATIC SWITCH FOR CIRCUITS OF INTERNAL-COMBUSTION ENGINES.

1,422,318.  Specification of Letters Patent.  Patented July 11, 1922.

Application filed October 6, 1920. Serial No. 415,060.

*To all whom it may concern:*

Be it known that I, SIDNEY STEVENS, a citizen of the United States, residing at Millinocket, in the county of Penobscot and State of Maine, have invented certain new and useful Improvements in Automatic Switches for Circuits of Internal-Combustion Engines, of which the following is a specification, reference being had to the accompanying drawings.

This invention relates to certain improvements in automatic switches for circuits of internal combustion engines of self-propelled vehicles.

An important object of the invention is to provide an apparatus of this character whereby the circuit of the engine is automatically disconnected when the driver leaves his seat or when sitting in a certain position thereon, and which is automatically reconnected when he resumes the driving position or returns to his seat.

A further object of the invention is to provide means in a device of this character whereby the seat may be locked in the elevated position, in which position the switch is disconnected thereby locking the machine with an open circuit and effectually preventing unauthorized use thereof.

A still further object of the invention is to provide a switch of this character which will not be operated by slight jolts and jars of the road which tend to separate the driver from his seat.

A still further object of the invention is to provide in conjunction with a switch of this character, means whereby the upward movement of the seat is checked upon the driver leaving the same, thereby further assisting in preventing disconnection of the engine by jars tending to force the driver from his seat.

Other objects and advantages of the invention will become apparent throughout the course of the following description:

In the accompanying drawings, wherein for the purpose of illustration is shown a preferred embodiment of my invention, and wherein like reference characters designate like parts throughout:

Figure 1 is a side elevation partly in section of an automobile seat switch constructed in accordance with my invention;

Figure 2 is a sectional view illustrating the switch;

Figure 3 is a sectional view showing the means for locking the seat in elevated position;

Figure 4 is a diagrammatic view showing the wiring system employed;

Figure 5 is a sectional view taken through the piston and cylinder showing the construction thereof.

Referring now more particularly to the drawings, the letter S indicates a suitable seat support of an automobile, and forwardly upon this support is disposed a relatively stationary seat portion 10 carried by the seat support, forming approximately one-third of the transverse width thereof. Secured to the seat support S immediately rearwardly of the stationary seat 10, is pivotally connected a shiftable seat section 11. Springs 12 having their ends secured to the rear portion of the shiftable section 11 and to the seat support therebeneath, tend to force the rear end of the shiftable seat section upwardly.

A bracket 14 is provided substantially U-shaped in form and having one arm thereof secured to the under surface of the seat, as indicated at 15. The other arm 16 of the bracket 14 extends above the seat and is provided with an opening 17. Secured to the framework F of the automobile is a stationary member 18 embodying an overhanging portion 19 against which the arm 16 of the bracket 14 abuts when the rear portion of the shiftable seat section 11 is fully elevated. This overhanging portion 19 is provided with an opening 20 alined with the opening 17 and coacting therewith to receive the hasp of the padlock 21. It will be seen that the seat section 11 may be locked in the uppermost position. The member 18 is preferably so secured to the frame-work F that the bracket 14 covers the securing means thereof when the bracket is in the elevated position, thereby preventing the removal of the same, and the securing means for the bracket 14 being beneath the seat are inaccessible, thereby preventing disturbance of the lock by the removal of the securing means.

Secured to the seat section 11 adjacent the rear end thereof is a member 21, preferably tubular and arcuately curved with the pivot point 12' as the center. The lower end of this bracket slidably extends through openings 22 formed in spaced arms 23 of a bracket 24 secured to the seat support S in any suitable manner. Intermediate the arms 23 of the bracket 24 a sleeve 25 is slidably mounted upon the tubular member 21. This sleeve is suitably connected with a shiftable member adapted to make and break contact between the terminals of the engine circuit C of the vehicle. The apparatus utilized to achieve this end may take any desired form. I have, however, illustrated in the accompanying drawings one form of such an apparatus in which the numeral 26 indicates the spring contacts forming terminals of the circuit C, and which contacts by their inherent resiliency remain in engagement. The numeral 27 designates a block of insulating material slidably mounted within the tubular member 21 provided with the wedge-like joint 28 adapted to engage intermediate the contacts and separate the same. The tubular member is provided with diametrically opposed elongated slots 29 through which extends a pin 30 which engages in the block 27 and in the sleeve 25. The block 27 is provided with a pocket 31 in which is contained a spring-pressed ball 32 which is adapted to coact with vertically spaced sockets 33 and 34 formed in the interior of the tubular member 21. The engagement of the ball 32 with these sockets checks but does not prevent movement of the block 27 when urged by the movement of the sleeve 25.

It will be seen that when the seat section 11 is shifted vertically, the tubular member 21 shifting vertically brings the sleeve 25 into engagement with the uppermost arm of the bracket 24. The member 21 continuing in its movement, the sleeve is forced downwardly thereon carrying with the block 27 and causing the point 28 of this block to engage intermediate the contacts and separate the same, breaking the circuit. At this point the ball 32 is engaged with the socket 24 and the block 27 is accordingly held against accidental displacement. Upon the seat being moved downwardly against the action of the springs 12, the sleeve 25 coming into engagement with the lowermost arm 23 is again shifted upwardly on the tubular member 21 causing the point 28 to be withdrawn from the contacts 26 and permitting these contacts to come into engagement completing the circuit. It will be obvious that a slight jolt or jar not tending to cause a complete elevation of the seat will not cause the circuit C to be broken, and will accordingly permit of driving on rough roads without missing of the engine for this reason.

To further assist in preventing accidental breaking of the circuit during the driving of the machine due to the driver being jolted from his seat, I have provided a snubbing device to check but not prevent the upward movement of the section 11. This consists in a cylinder 35 within which operates a piston 36 which has a loose fit with the cylinder 35, as indicated at $36^a$. To the upper end of the piston rod 37 is pivotally connected a link 38 which in turn has its upper end connected with the lower end of the seat section 11, as at 39. The piston is provided with a large port 40 closed by a flap valve 41 which opens upwardly. It will be seen that the piston 36 offers no resistance to the downward movement of the seat section 11 as the air may pass not only about the piston but through the port 40. When, however, the piston is moving upwardly, the valve 41 being closed will necessitate the air passing about the edges of the piston, and accordingly this upward movement is checked. I prefer that the size of the port and leakage about the piston shall permit downward movement of the seat in about one second and shall check the upward movement of the seat sufficiently to cause such movement to consume the space of five or six seconds. As a jolt or jar will not cause the driver to leave his seat for this space of time, it will be seen that such jolts or jars will be ineffectual to cause the breakage of the circuit.

When it is desired to remain in the machine, and at the same time disconnect the engine, the operator may slide upward upon his seat assuming the slouching position so often assumed by drivers when not actually driving the machine, placing the weight of the body upon the section 10 and permitting the section 11 to elevate. When actually driving the car, the driver's feet being placed upon the pedals naturally necessite his assuming a more upright position, and accordingly, place weight upon the section 11, depressing the same and completing the circuit.

From the foregoing, it will be obvious that I have evolved an automatic switch for the circuits of internal combustion engines which is particularly well adapted for use by reason of the fact that accidental breaking of the circuit is insured against, and because of the fact that the circuit may, if so desired, be locked in inoperative position; and it will likewise be obvious that the construction hereinbefore set forth is intended merely in an illustrative and limiting sense as many obvious changes are possible without in any manner departing from the spirit of my invention. I, accordingly, do not limit myself to the specific structure hereinbefore set forth, except as so limited by the sub-joined claims.

What I claim is:

1. The combination with a vehicle embodying an internal combustion engine, a circuit therefor and a driver's seat embodying a vertical shiftable section, of means operated by the elevation of said seat for breaking the circuit of the engine and by the lowering of said seat for completing the circuit of the engine and means for locking said seat in elevated position comprising, a member secured to said shiftable seat section and embodying an angular portion provided with an opening, a member secured to the frame-work of the vehicle and embodying an angular portion against which the first-named angular portion abuts when the seat is in the elevated position, said second-named angular portion being provided with an opening alined with the opening of the first-named angular portion and coacting therewith to receive the hasp of a padlock.

2. The combination with a vehicle embodying an internal combustion engine, a circuit therefor and a vertical shiftable driver's seat, of means operated by the complete elevation of said seat for breaking the circuit of the engine and by the lowering of said seat for completing the circuit of the engine, and means for retarding the elevation of said seat.

3. The combination with a vehicle embodying an internal combustion engine, a circuit therefor and a vertical shiftable driver's seat, of means operated by the complete elevation of said seat for breaking the circuit of the engine and by the lowering of said seat for completing the circuit of the engine comprising a relatively stationary cylinder, a piston reciprocable within the cylinder and having a loose fit therewith, a port in said piston, a valve for said port, means connecting said piston and said seat whereby said piston is shifted simultaneously with said seat, said valve closing said port when said seat is being elevated.

4. The combination with a vehicle embodying an internal combustion engine, a circuit therefor and a vertical shiftable driver's seat, automatic means for shifting said seat vertically, means operated by the elevation of said seat for breaking the circuit of the engine, said means being unable to break said circuit by a partial elevation of said seat, and means for checking the upward movement of said seat.

5. The combination with a vehicle embodying an internal combustion engine and a circuit therefor, of a driver's seat comprising a stationary section and a shiftable section, means for shifting said shiftable section vertically, said means being overcome by the weight of the driver, means operated by the complete elevation of said seat for disconnecting the circuit and by the depression of said seat for connecting the same, means for checking the movement of said shiftable section and means for locking said shiftable section in elevated position.

In testimony whereof I hereunto affix my signature.

SIDNEY STEVENS.